April 13, 1965 S. REDNER 3,177,761
POLARISCOPE HAVING SIMULTANEOUSLY ROTATABLE WAVEPLATES
Filed Sept. 9, 1963
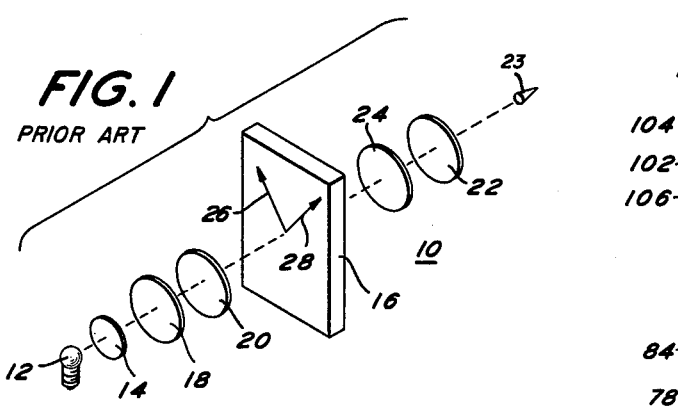
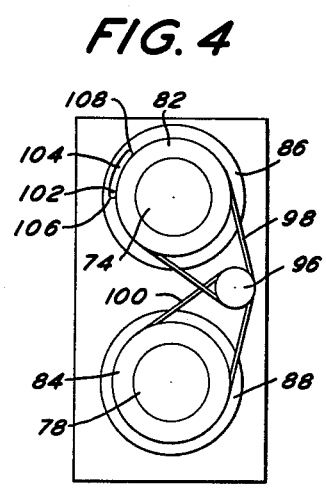
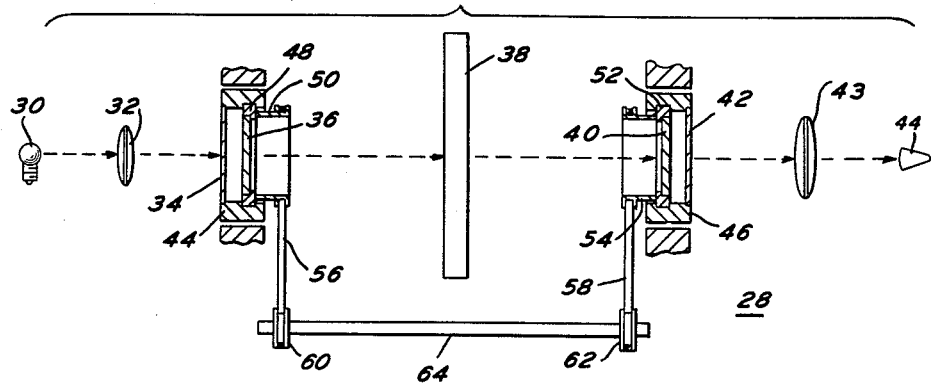
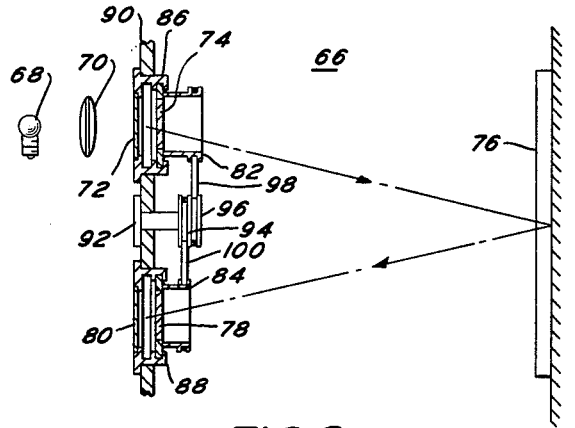
INVENTOR.
SALOMON REDNER
BY Arthur H. Seidel
ATTORNEY

3,177,761
POLARISCOPE HAVING SIMULTANEOUSLY ROTATABLE WAVEPLATES
Salomon Redner, Norristown, Pa., assignor to Photolastic, Inc., Malvern, Pa., a corporation of Pennsylvania
Filed Sept. 9, 1963, Ser. No. 307,672
5 Claims. (Cl. 88—14)

In general, this invention relates to a new and improved polariscope and more particularly to a new and better polariscope capable of investigating photoelastic and other birefringent properties of materials.

In order to fully investigate the birefringent or double refraction properties of a specimen through which a polarized light has been transmitted, usually two physical quantities have to be measured separately.

One of these physical properties is the azimuth or spaced orientation of the polarized light beams emerging. The second is the relative retardation or phase difference between these beams. Such measurements are common in the art of crystallography and especially in the art of photoelasticity. In photoelasticity, the polariscope is used to determine stresses or strains existing in plastic by measurement of the birefringence created by these stresses and strains.

The conventional polariscope consists of a monochromatic or white light source, a focusing lens, a polarizer, the specimen, and an analyzer. The light source provides a monochromatic light which is condensed by the lens to provide a parallel or non-parallel light beam directed toward the specimen under investigation. This light beam is then polarized by the interposition of a so-called polarizer. The polarizer may be a Nicol prism from which the light emerges vibrating in a single plane. Further, the polarizer might be a polarizing film such as "Polaroid" instead of Nicol. The light emerging from the polarizer is thus oriented in the sense that all vibrations are contained in planes parallel to the axis of the polarizer.

The light that arrives at the investigated specimen is therefore polarized along a known direction or azimuth. It is well known that such a polarized beam is split when passing through a crystal or forced birefringent material. A forced birefringent material may be plastic subjected to stress. The polarized beam, thus passing through such a specimen would be split into two beams travelling along the principal axes of the specimen unless the axis of polarization of the light from the polarizer is parallel to one of the principal axes of the specimen. It should be understood that most specimens will have two principal axes which are perpendicular to one another.

When the axis of polarization of the polarizer is parallel to a principal axis of the specimen, the light emerging from the specimen is also polarized in the axis of the polarizer. When the axis of the specimen is not parallel to the received polarized light beam, two beams polarized in the direction of the axes of the specimen are transmitted from the specimen.

The analyzer receives the beams from the specimen. The analyzer is manufactured of a material similar to the polarizer and is used to determine the azimuth or position of the axes of the specimen. When the axis of the analyzer is perpendicular to the axis of the polarizer (crossed polariscope arrangement), an extinction of all light would be obtained if the axis of the polarizer is parallel to one of the axes of the specimen. The measurement of this azimuth is therefore performed by mechanically, electrically, or otherwise coupling the motion of the polarizer and analyzer until extinction is observed. This occurs by achieving common angular rotation of the analyzer and polarizer while maintaining the axis of polarization of these two elements perpendicular to one another. The common rotation is usually measured on an angular scale and provides the measurement of azimuth desired.

For the measurement of the phase shift or relative retardation of the specimen, various methods are available. One of the most popular methods is the use of so-called quarter wavelength plates. These are plastic plates of a predetermined thickness permanently deformed until the birefringence or relative retardation between two polarized light beams propagated along their principal axes is equal to one quarter of the wavelength of the light considered.

One quarter wavelength plate is introduced into the polariscope between the polarizer and the specimen and another quarter wavelength plate is introduced between the specimen and the analyzer. These quarter wavelength plates are introduced with their optical axes each oriented at 45° to the axis of their respective polarizer and analyzer. In this manner, a so-called "circular" polariscope is obtained. It can be shown, that in such a system, when the axis of the polarizer is parallel to one of the principal axes of the specimen and the analyzer is perpendicular to the axis of the polarizer, the light emerging from the quarter wavelength plate adjacent the analyzer is still polarized in a single plane. However, the light emerging from the analyzer quarter wavelength plate has a plane of vibration or polarization rotated by an angle which is consistent with the following relationship:

$$\varphi = \pi \frac{\delta}{\alpha}$$

$\varphi$ is the angle of rotation of the plane of polarization determined by the difference between the initial position of the analyzer and the angle to which it need be rotated to extinguish the light beam. $\delta$ is the relative retardation of the investigated specimen and $\alpha$ is the wavelength of the light employed.

There are a large variety of industrial polariscopes containing the elements described above, namely, the polarizing and analyzing filters, and the quarter wavelength plates. These polariscopes operate either by maintaining these elements in an aligned arrangement or in a reflective arrangement. In these instruments, the quarter wavelength plates can be in the field to measure relative retardation or removed from it to measure azimuth.

It is the general object of this invention to provide a new and improved polariscope which is simpler and easier to operate.

A further object of this invention is the provision of a new and better polariscope wherein relative retardation and azimuth can be measured without the necessity of removing the quarter wavelength plates.

Another object of this invention is to provide a new and improved polariscope which does not require new adjustments for each operation thereof.

Other objects will appear hereinafter.

For the purpose of illustrating the invention, there are shown in the drawings forms which are presently preferred; it being understood, however, that this invention is not limited to the precise arrangements and instrumentalities shown.

FIGURE 1 is a schematic showing of a standard polariscope.

FIGURE 2 is a cross sectional view of a transmission polariscope incorporating the principles of the present invention.

FIGURE 3 is a cross sectional view of a reflective type polariscope built in accordance with the principles of the present invention.

FIGURE 4 is a plan view of the quarter wavelength plate indexing apparatus of the reflective polariscope of FIGURE 3.

In FIGURE 1, there is shown a conventional polariscope generally designated by the numeral 10. The polariscope 10 includes a source of white or monochromatic light 12. The light from the source 12 passes through a suitable optical lens 14 which condenses the light from the source 12 into a parallel or non-parallel light beam directed toward the specimen 16 which is under investigation.

Between the lens 14 and the specimen 16 there is placed a polarizer 18. The polarizer 18 is a sheet of polarizing film, but could be a Nicol prism as was discussed previously. Between the polarizer 18 and the specimen 16 there is placed a quarter wavelength plate 20. The plate 20 is manufactured of "Micarta" of carefully determined thickness, or permanently deformed plastic, so that the birefringence or relative retardation between two polarized light beams propagated along the principal axis of the quarter wavelength plate 20 is equal to one quarter of the wavelength of the light considered. The optical axis of the quarter wavelength plate 20 is oriented at 45° to the axis of the polarizer 18.

An analyzer 22 is placed on the opposite side of the specimen 16 between the specimen 16 and a viewer 23. It will be understood that the viewer 23 may be photographic or kinematographic camera, photoelectric cell, or other suitable sensitive unit which could be substituted in place of the observer's eye.

The analyzer 22 is manufactured of material similar to the polarizer 18 and is oriented so that its plane of polarization is perpendicular to the plane of polarization of the polarizer 18.

Between the analyzer 22 and the specimen 16 there is placed an analyzer quarter wavelength plate 24. The analyzer quarter wavelength plate 24 is exactly similar to the quarter wavelength plate 20 associated with polarizer 18. Quarter wavelength plate 24 has its optical axis oriented at 45° to the axis of the analyzer.

As was stated previously, the apparatus shown in FIGURE 1 will measure the phase shift or relative retardation in the specimen 16. With the axis of the analyzer quarter wavelength plate 24 located at a 45° angle to the axes 26 and 28 of specimen 16, the light emerging from the anlyzer quarter wavelength plate 24 and received by the analyzer 22 is polarized in a single plane rotated from the plane of polarization of the analyzer 22 by the angle $\varphi$.

The relative retardation can thus be easily measured by rotation of the analyzer 22 until extinction is observed. At that point, the analyzer will be located at the angle $\varphi$ to its initial position, the initial position being perpendicular to the polarizer.

To measure the azimuth with the apparatus of FIGURE 1, it has been the practice to remove the quarter wavelength plates 20 and 24 and rotate the polarizer 18 and the analyzer 22 simultaneously with their axes perpendicular to one another until there is extinction of the light beam seen by the viewer.

The conventional transmission type polariscope shown in FIGURE 1 has been modified in the showing in FIGURE 2 in accordance with the principles of the present invention. That is, the transmission polariscope 28 shown in FIGURE 2 consists of a light source 30, lens 32, polarizer 34, polarizer quarter wavelength plate 36, specimen 38, analyzer quarter wavelength plate 40, analyzer 42, a viewing lens 43, and a viewer 44. These elements are axially aligned in the same manner as the conventional apparatus of FIGURE 1. However, the transmission polariscope 28 of the present invention includes a polarizer support 44 for supporting the polarizer 34 and polarizer quarter wavelength plate 36; and an analyzer support 46 for supporting the analyzer quarter wavelength plate 40 and analyzer 42. The polarizer quarter wavelength plate 36 is rotatably mounted in a groove 48 on the polarizer support 44 and is integral with a rotatable pulley hub 50. The analyzer quarter wavelength plate 40 is also rotatably mounted in a groove 52 on the analyzer support 46 and is integral with a separate pulley hub 54. The pulley hubs 50 and 54 are connected through belts 56 and 58 to their respective pulleys 60 and 62 mounted on a common drive shaft 64. The drive shaft 64 can turn sufficiently to produce only 45° rotation of quarter wavelength plates 36 and 40. In a first limit of rotation, the quarter wavelength plates 36 and 40 have their optical axes respectively parallel to the optical axes of polarizer 34 and analyzer 42. In this position, optically, the quarter wavelength plates are inoperative. The polarized light that passes through polarizer 34 will not be refracted by polarizer quarter wavelength plate 36 but will pass therethrough without any effect thereon. Similarly, the analyzer quarter wavelength plate 40 will have no effect on the operation of the analyzer 42.

At its other limit of rotation, the shaft 64 will be operative to simultaneously rotate the quarter wavelength plates 36 and 40 until their optical axes are at 45° to the axis of polarizer 34 and analyzer 42 respectively to achieve so-called "circular" light.

By so mounting the quarter wavelength plates, it is possible in the first position wherein the optical axes of the quarter wavelength plates are parallel to the optical axes of the polarizer and analyzer respectively to determine the azimuth of the specimen 38 without the necessity for removing the polarizer or analyzer quarter wavelength plates. Further, in the second position, the relative retardation or phase shift can be simply determined. Since the shaft 64 can be easily set up for two limits of travel, the quarter wavelength plates 36 and 40 can be accurately positioned for quick measurements without the necessity for aligning them for every operation. Thus the two quarter wavelengths can be easily rotated together transforming the polariscope by one simple motion from "plane" to "circular" polarization.

In FIGURE 3, there is shown a second embodiment of the present invention in the form of a reflection polariscope 66.

The reflection polariscope 66 includes a light source 68, lens 70, polarizer 72, polarizer quarter wavelength plate 74, reflective specimen 76, analyzer quarter wavelength plate 78 and analyzer 80. The specimen 76 reflects the beam from polarizer quarter wavelength plate 74 and refracts it in accordance with the birefringent properties thereof. In all other ways, the reflection polariscope 66 is exactly similar to the transmission polariscope 28 discussed in FIGURE 2.

The quarter wavelength plates 74 and 78 are mounted for rotation on hubs 82 and 84 respectively. The hubs 82 and 84 which support quarter wavelength plates 74 and 78 are mounted for rotation within polarizer support 86 and analyzer support 88. Polarizer support 86 and analyzer support 88 are mounted on a common body 90 approximately parallel to the specimen 76. The common body 90 supports a fixed shaft 92 between the supports 86 and 88. On the shaft 92 there are provided a pair of rotatably mounted pulleys 94 and 96. A belt 98 mechanically interconnects pulley 96 with hub 82 and a belt 100 mechanically interconnects pulley 94 with hub 84.

The pulleys 94 and 96 are integrally connected together for rotatable movement on shaft 92. Thus, rotation of the polarizer hub 82 would cause simultaneous synchronized rotation of analyzer hub 84.

The polarizer hub 82 has an integral limit stop 102 fitted within the suitable guide slot 104 in the polarizer support 86. Rotation of the limit stop 102 causes corresponding rotation of the polarizer quarter wavelength plate 74 and its hub 82. Since hub 82 is mechanically connected to analyzer hub 84 through the belt and pulley arrangement discussed above, the analyzer quarter wavelength plate 78 rotated through an arc corresponding to the arc through which polarizer quarter wavelength plate 74 has rotated.

The slot 104 is arcuate and is 45° in length. Rotation of the limit stop 102 to one end 106 of the slot 104 has rotated the polarizer quarter wavelength plate 74 to a position in which one of its optical axes is parallel to the optical axis of the polarizer 72. Similarly, this movement of polarizer quarter wavelength plate 74 has positioned analyzer quarter wavelength plate 78 with one of its optical axes parallel to the optical axis of analyzer 80.

Rotation of limit stop 102 to the other end 108 of the arcuate guide slot 104 rotates the polarizer quarter wavelength plate 74 through a 45° arc. Thus, the axes of polarizer quarter wavelength plate 74 and analyzer quarter wavelength plate 78 will be rotated 45° with respect to their respective optical axes of polarizer 72 and analyzer 80.

It will be understood, that although a simple mechanical guided movement for rotation of the quarter wavelength plates through an arc of 45° is achieved by the apparatus shown in FIGURES 2, 3 and 4, the rotation of these quarter wavelength plates could be achieved by other synchronized electrical or mechanical means.

The present invention may be embodied in other specific forms without departing from the spirit or essential attributes thereof and, accordingly, reference should be made to the appended claims, rather than to the foregoing specification as indicating the scope of the invention.

I claim:

1. A polariscope comprising a source of light, a polarizer mounted adjacent said source of light to polarize light in an optical plane, an analyzer, said analyzer having an optical plane of polarization, analyzer support means for supporting said analyzer with the optical plane of polarization thereof perpendicular to the optical plane of polarization of said polarizer, a quarter wavelength polarizer birefringent plate mounted along a common optical axis between said polarizer and analyzer, a quarter wavelength analyzer birefringent plate mounted along said optical axis between said polarizer birefringent plate and said analyzer, an analyzer birefringent plate support means for supporting said analyzer birefringent plate for rotative movement with respect to said analyzer, a polarizer birefringent plate support means for supporting said polarizer birefringent plate for rotative movement with respect to said polarizer, and coupling means coupling said analyzer birefringent plate support means and said polarizer birefringent plate support means for rotating said polarizer birefringent plate support means and analyzer birefringent plate support means in synchronization relative to said polarizer and analyzer between a first rotative position wherein said analyzer and polarizer birefringent plates have an optical axis parallel to the optical planes of polarization of said analyzer and polarizer respectively, and a second rotative position wherein said analyzer and polarizer birefringent plates have an optical axis oriented at 45° to the optical planes of polarization of said analyzer and polarizer respectively.

2. The polariscope of claim 1 wherein said coupling means includes at least one limit stop, said one limit stop corresponding to the position of rotation of said analyzer birefringent support means wherein an optical axis of said analyzer birefringent plate is parallel to the optical plane of polarization of said analyzer, said one limit stop also corresponding to the position of said polarizer birefringent plate support means wherein said polarizer birefringent plate has an optical axis thereof parallel to the optical plane of polarization of said polarizer.

3. The polariscope of claim 2 wherein said coupling means including a second limit stop, said second limit stop being spaced 45 arcuate degrees from said one limit stop, said second limit stop preventing rotation of said analyzer birefringent plate support means when an optical axis of said analyzer birefringent plate is aligned at an angle of 45° with respect to the optical plane of polarization of said analyzer, said second limit stop also preventing rotation of said polarizer birefringent plate support means when said polarizer birefringent plate has an optical axis at an angle of 45° with respect to the optical plane of polarization of said polarizer.

4. The polariscope of claim 3 wherein said coupling means includes a guide, said guide having said one limit stop at one end thereof and said second limit stop at the other end thereof, said guide allowing only 45° rotation of said analyzer and polarizer birefringent plates.

5. The polariscope of claim 4 including a common shaft, said common shaft being mechanically coupled to said analyzer birefringent plate support means and said polarizer birefringent plate support means whereby rotation of said analyzer birefringent plate support causes corresponding rotation of said polarizer birefringent plate support means.

References Cited by the Examiner

UNITED STATES PATENTS

| 2,206,303 | 7/40 | Neumueller et al. | |
| 2,383,186 | 8/45 | Glasser | 88—65 XR |
| 2,766,659 | 10/56 | Baerwald | 88—65 XR |
| 3,062,087 | 11/62 | Zandman et al. | 88—65 XR |

FOREIGN PATENTS 946,695  12/48  France.

JEWELL H. PEDERSEN, *Primary Examiner.*